US009853812B2

(12) United States Patent
Mehta et al.

(10) Patent No.: US 9,853,812 B2
(45) Date of Patent: Dec. 26, 2017

(54) SECURE KEY MANAGEMENT FOR ROAMING PROTECTED CONTENT

(71) Applicant: Microsoft Technology Licensing, LLC, Redmond, WA (US)

(72) Inventors: Yogesh A. Mehta, Redmond, WA (US); Innokentiy Basmov, Redmond, WA (US); Octavian T. Ureche, Bellevue, WA (US); Peter J. Novotney, Seattle, WA (US); Preston Derek Adam, Woodinville, WA (US); Mugdha Lakhani, Cambridge (GB); Saurav Sinha, Bellevue, WA (US); Narendra S. Acharya, Kirkland, WA (US); Karanbir Singh, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/489,288

(22) Filed: Sep. 17, 2014

(65) Prior Publication Data

US 2016/0080149 A1    Mar. 17, 2016

(51) Int. Cl.
*H04L 9/08* (2006.01)
*G06F 21/62* (2013.01)
(Continued)

(52) U.S. Cl.
CPC .......... *H04L 9/0894* (2013.01); *G06F 21/604* (2013.01); *G06F 21/62* (2013.01);
(Continued)

(58) Field of Classification Search
CPC .... G06F 21/604; G06F 21/62; G06F 21/6209; G06F 21/6218; H04L 9/08; H04L 9/0894; H04L 9/0897; H04L 9/30
See application file for complete search history.

(56) References Cited

U.S. PATENT DOCUMENTS 5,495,533 A   2/1996 Linehan et al.
5,787,131 A   7/1998 Bottomley
(Continued)

FOREIGN PATENT DOCUMENTS

CN   1653422    8/2005
CN   1713756    12/2005
(Continued)

OTHER PUBLICATIONS

Vishal Kher and Yongdae Kim, Securing distributed storage—challenges, techniques, and systems, 2005 ACM workshop on Storage security and survivability, p. 9-25 (ACM 2005).*
(Continued)

*Primary Examiner* — Theodore C Parsons

(57) ABSTRACT

Content on a device is encrypted and protected based on a data protection key corresponding to a particular identity of the user of the device. The protected content can then be stored to cloud storage, and from the cloud storage the protected content can be transferred to various other ones of the user's devices. A data protection key that is used to retrieve the plaintext content from the protected content is maintained by the user's device. This data protection key can be securely transferred to other of the user's devices, allowing any of the user's devices to access the protected content.

20 Claims, 5 Drawing Sheets

(51) Int. Cl.
*G06F 21/60* (2013.01)
*H04L 9/30* (2006.01)
*H04L 29/06* (2006.01)
*H04W 12/02* (2009.01)
*H04W 12/08* (2009.01)

(52) U.S. Cl.
CPC ...... *G06F 21/6209* (2013.01); *G06F 21/6218* (2013.01); *H04L 9/08* (2013.01); *H04L 9/0897* (2013.01); *H04L 9/30* (2013.01); *H04L 63/0442* (2013.01); *H04W 12/02* (2013.01); *H04W 12/08* (2013.01)

(56) References Cited

U.S. PATENT DOCUMENTS

| | | | |
|---|---|---|---|
| 5,897,661 A | 4/1999 | Baranovsky et al. | |
| 5,944,783 A | 8/1999 | Neiten | |
| 5,966,263 A | 10/1999 | Freitas et al. | |
| 5,974,503 A | 10/1999 | Venkatesh et al. | |
| 6,016,402 A | 1/2000 | Thomas et al. | |
| 6,028,725 A | 2/2000 | Blumenau | |
| 6,041,386 A | 3/2000 | Bello | |
| 6,067,199 A | 5/2000 | Blumenau | |
| 6,076,143 A | 6/2000 | Blumenau | |
| 6,134,062 A | 10/2000 | Blumenau | |
| 6,151,665 A | 11/2000 | Blumenau | |
| 6,170,037 B1 | 1/2001 | Blumenau | |
| 6,170,055 B1 | 1/2001 | Meyer et al. | |
| 6,253,300 B1 | 6/2001 | Lawrence et al. | |
| 6,292,317 B1 | 9/2001 | Alexander | |
| 6,292,790 B1 | 9/2001 | Krahn et al. | |
| 6,550,011 B1* | 4/2003 | Sims, III | G06F 21/10 365/52 |
| 6,665,784 B2 | 12/2003 | Ihde et al. | |
| 6,727,896 B2 | 4/2004 | Tsang | |
| 6,728,379 B1 | 4/2004 | Ishibashi et al. | |
| 6,789,162 B1 | 9/2004 | Talagala et al. | |
| 6,944,742 B1 | 9/2005 | Shoff et al. | |
| 6,968,973 B2 | 11/2005 | Uyttendaele et al. | |
| 6,996,696 B2 | 2/2006 | Shoff et al. | |
| 7,197,638 B1 | 3/2007 | Grawrock et al. | |
| 7,356,662 B2 | 4/2008 | Shoff et al. | |
| 7,360,073 B1 | 4/2008 | Billstrom et al. | |
| 7,380,140 B1 | 5/2008 | Weissman et al. | |
| 7,382,883 B2 | 6/2008 | Cross et al. | |
| 7,409,623 B2 | 8/2008 | Baker et al. | |
| 7,451,484 B1 | 11/2008 | Nadalin et al. | |
| 7,536,536 B1 | 5/2009 | Joshi et al. | |
| 7,559,088 B2 | 7/2009 | Cohen et al. | |
| 7,580,950 B2 | 8/2009 | Kavuri et al. | |
| 7,594,087 B2 | 9/2009 | Zeevi et al. | |
| 7,646,380 B2 | 1/2010 | Tsang | |
| 7,694,134 B2 | 4/2010 | Witt et al. | |
| 7,711,923 B2 | 5/2010 | Rogers et al. | |
| 7,725,703 B2 | 5/2010 | Hunter et al. | |
| 7,757,100 B2 | 7/2010 | Weissman et al. | |
| 7,849,254 B2 | 12/2010 | Ash et al. | |
| 7,890,664 B1 | 2/2011 | Tao et al. | |
| 7,903,549 B2 | 3/2011 | Judge et al. | |
| 7,930,540 B2 | 4/2011 | Ahuja et al. | |
| 7,962,739 B2 | 6/2011 | Childs et al. | |
| 7,979,626 B2 | 7/2011 | Rogers | |
| 8,046,365 B2 | 10/2011 | Saito | |
| 8,046,533 B2 | 10/2011 | Kompella et al. | |
| 8,085,933 B2 | 12/2011 | Ferguson | |
| 8,214,656 B1 | 7/2012 | Plotkin et al. | |
| 8,234,477 B2 | 7/2012 | Shaath | |
| 8,249,257 B2 | 8/2012 | Brutch et al. | |
| 8,321,688 B2 | 11/2012 | Auradkar et al. | |
| 8,341,427 B2 | 12/2012 | Auradkar et al. | |
| 8,341,430 B2 | 12/2012 | Ureche et al. | |
| 8,387,109 B2 | 2/2013 | Ureche et al. | |
| 8,411,863 B2 | 4/2013 | Ureche et al. | |
| 8,416,954 B1 | 4/2013 | Raizen et al. | |
| 8,417,973 B2 | 4/2013 | Cooper et al. | |
| 8,423,792 B2 | 4/2013 | Luciani et al. | |
| 8,458,490 B2 | 6/2013 | Konetski et al. | |
| 8,527,561 B1 | 9/2013 | Moody, II et al. | |
| 8,538,919 B1 | 9/2013 | Nielsen et al. | |
| 8,549,271 B1 | 10/2013 | Joshi et al. | |
| 8,583,879 B2 | 11/2013 | Na et al. | |
| 8,588,422 B2 | 11/2013 | Beachem et al. | |
| 8,625,802 B2 | 1/2014 | Parann-Nissany | |
| 8,661,193 B1 | 2/2014 | Cobos et al. | |
| 8,667,213 B2 | 3/2014 | Rogers et al. | |
| 8,689,279 B2 | 4/2014 | Basmov et al. | |
| 8,726,343 B1 | 5/2014 | Borzycki et al. | |
| 8,726,407 B2 | 5/2014 | Etchegoyen | |
| 8,769,305 B2 | 7/2014 | Blaisdell | |
| 8,874,935 B2 | 10/2014 | Basmov et al. | |
| 8,875,304 B2 | 10/2014 | Celi, Jr. et al. | |
| 9,323,465 B2 | 4/2016 | Flynn et al. | |
| 9,369,289 B1 | 6/2016 | Harrison et al. | |
| 9,477,614 B2 | 10/2016 | Basmov et al. | |
| 9,537,656 B2 | 1/2017 | Debout et al. | |
| 9,740,639 B2 | 8/2017 | Basmov et al. | |
| 9,825,945 B2 | 11/2017 | Adam et al. | |
| 2001/0000265 A1 | 4/2001 | Schreiber et al. | |
| 2002/0019935 A1* | 2/2002 | Andrew | G06F 12/1408 713/165 |
| 2003/0081784 A1 | 5/2003 | Kallahalla et al. | |
| 2003/0084298 A1 | 5/2003 | Messerges et al. | |
| 2003/0196114 A1 | 10/2003 | Brew et al. | |
| 2003/0221095 A1 | 11/2003 | Gaunt et al. | |
| 2004/0044912 A1 | 3/2004 | Connary et al. | |
| 2004/0090811 A1 | 5/2004 | Kang | |
| 2004/0146015 A1* | 7/2004 | Cross | G06Q 20/3829 370/328 |
| 2004/0174345 A1 | 9/2004 | Tsang | |
| 2005/0071280 A1* | 3/2005 | Irwin | H04L 9/0825 705/59 |
| 2005/0091661 A1 | 4/2005 | Kurien et al. | |
| 2005/0097341 A1 | 5/2005 | Francis et al. | |
| 2005/0213377 A1 | 9/2005 | Shoff et al. | |
| 2005/0262361 A1 | 11/2005 | Thibadeau | |
| 2005/0265074 A1 | 12/2005 | Shoff et al. | |
| 2005/0283730 A1 | 12/2005 | Uyttendaele et al. | |
| 2006/0101027 A1 | 5/2006 | Hotchkiss | |
| 2006/0155919 A1 | 7/2006 | Lasser et al. | |
| 2006/0190984 A1 | 8/2006 | Heard et al. | |
| 2006/0206507 A1 | 9/2006 | Dahbour | |
| 2006/0277590 A1 | 12/2006 | Limont et al. | |
| 2006/0279556 A1 | 12/2006 | Tsang | |
| 2007/0028231 A1 | 2/2007 | Kelso et al. | |
| 2007/0058806 A1 | 3/2007 | Ferguson | |
| 2007/0150886 A1 | 6/2007 | Shapiro | |
| 2007/0244940 A1 | 10/2007 | Devarakonda et al. | |
| 2007/0250678 A1 | 10/2007 | Ueoka et al. | |
| 2007/0300008 A1 | 12/2007 | Rogers et al. | |
| 2007/0300037 A1 | 12/2007 | Rogers et al. | |
| 2008/0002830 A1 | 1/2008 | Cherkasov et al. | |
| 2008/0005467 A1 | 1/2008 | Morley et al. | |
| 2008/0010468 A1 | 1/2008 | Ruiz | |
| 2008/0082448 A1 | 4/2008 | Meijer et al. | |
| 2008/0083036 A1* | 4/2008 | Ozzie | H04L 63/0428 726/27 |
| 2008/0107262 A1 | 5/2008 | Helfman et al. | |
| 2008/0130156 A1 | 6/2008 | Chu et al. | |
| 2008/0141040 A1 | 6/2008 | Biddle et al. | |
| 2008/0155316 A1 | 6/2008 | Pawar et al. | |
| 2008/0168315 A1 | 7/2008 | Mead et al. | |
| 2008/0229428 A1 | 9/2008 | Camiel | |
| 2008/0240253 A1 | 10/2008 | Au et al. | |
| 2008/0240441 A1 | 10/2008 | Kawakami | |
| 2008/0263371 A1 | 10/2008 | Weissman et al. | |
| 2008/0301470 A1 | 12/2008 | Green et al. | |
| 2009/0024795 A1 | 1/2009 | Kobara | |
| 2009/0063756 A1 | 3/2009 | Asipov | |
| 2009/0075630 A1 | 3/2009 | McLean | |
| 2009/0132474 A1 | 5/2009 | Ma et al. | |
| 2009/0205012 A1 | 8/2009 | Jain et al. | |
| 2009/0210267 A1 | 8/2009 | Fish et al. | |
| 2009/0287874 A1 | 11/2009 | Rogers et al. | |

(56) References Cited

U.S. PATENT DOCUMENTS

| | | | |
|---|---|---|---|
| 2009/0307563 A1 | 12/2009 | Marquez et al. | |
| 2010/0082898 A1 | 4/2010 | Mangold et al. | |
| 2010/0100721 A1* | 4/2010 | Su | G06F 11/1456 713/150 |
| 2010/0107213 A1 | 4/2010 | Ureche et al. | |
| 2010/0169948 A1 | 7/2010 | Budko et al. | |
| 2010/0250847 A1 | 9/2010 | Chen | |
| 2010/0266132 A1 | 10/2010 | Bablani et al. | |
| 2010/0299152 A1 | 11/2010 | Batchu et al. | |
| 2010/0306175 A1 | 12/2010 | Johnson et al. | |
| 2010/0332725 A1 | 12/2010 | Post et al. | |
| 2011/0010560 A1 | 1/2011 | Etchegoyen | |
| 2011/0035577 A1 | 2/2011 | Lin et al. | |
| 2011/0055559 A1 | 3/2011 | Li et al. | |
| 2011/0055560 A1 | 3/2011 | Meissner et al. | |
| 2011/0060915 A1 | 3/2011 | Tal | |
| 2011/0078760 A1 | 3/2011 | De Perthuis | |
| 2011/0087890 A1 | 4/2011 | Munsil et al. | |
| 2011/0154023 A1 | 6/2011 | Smith et al. | |
| 2011/0202916 A1 | 8/2011 | VoBa et al. | |
| 2011/0225431 A1 | 9/2011 | Stufflebeam, Jr. et al. | |
| 2011/0225640 A1* | 9/2011 | Ganapathy | H04W 12/06 726/8 |
| 2011/0246785 A1 | 10/2011 | Linsley et al. | |
| 2011/0247047 A1 | 10/2011 | Loureiro et al. | |
| 2011/0252232 A1 | 10/2011 | De Atley et al. | |
| 2011/0264925 A1 | 10/2011 | Russo et al. | |
| 2011/0276683 A1 | 11/2011 | Goldschlag et al. | |
| 2011/0277013 A1 | 11/2011 | Chinta | |
| 2012/0017095 A1 | 1/2012 | Blenkhorn et al. | |
| 2012/0036347 A1 | 2/2012 | Swanson et al. | |
| 2012/0036370 A1 | 2/2012 | Lim et al. | |
| 2012/0079603 A1 | 3/2012 | Brown et al. | |
| 2012/0087033 A1 | 4/2012 | Yang | |
| 2012/0110345 A1 | 5/2012 | Pigeon et al. | |
| 2012/0159148 A1 | 6/2012 | Behren et al. | |
| 2012/0173882 A1 | 7/2012 | Horn et al. | |
| 2012/0239618 A1* | 9/2012 | Kung | G06F 21/6218 707/621 |
| 2012/0297190 A1 | 11/2012 | Shen et al. | |
| 2012/0331550 A1 | 12/2012 | Raj et al. | |
| 2013/0013856 A1 | 1/2013 | Rogers et al. | |
| 2013/0054977 A1 | 2/2013 | Basmov | |
| 2013/0054979 A1 | 2/2013 | Basmov | |
| 2013/0061035 A1* | 3/2013 | Hook | H04L 9/088 713/150 |
| 2013/0067242 A1 | 3/2013 | Lyakhovitskiy et al. | |
| 2013/0074142 A1 | 3/2013 | Brennan et al. | |
| 2013/0086691 A1 | 4/2013 | Fielder | |
| 2013/0091543 A1 | 4/2013 | Wade et al. | |
| 2013/0117561 A1 | 5/2013 | Chawla et al. | |
| 2013/0117805 A1 | 5/2013 | Kent et al. | |
| 2013/0124859 A1 | 5/2013 | Pestoni et al. | |
| 2013/0138971 A1 | 5/2013 | Budko et al. | |
| 2013/0198474 A1 | 8/2013 | Shaath | |
| 2013/0208893 A1 | 8/2013 | Shablygin et al. | |
| 2013/0283392 A1 | 10/2013 | Mirashrafi et al. | |
| 2013/0291055 A1 | 10/2013 | Muppidi et al. | |
| 2013/0318359 A1 | 11/2013 | Morris et al. | |
| 2014/0007182 A1 | 1/2014 | Qureshi et al. | |
| 2014/0007222 A1 | 1/2014 | Qureshi et al. | |
| 2014/0019753 A1 | 1/2014 | Lowry et al. | |
| 2014/0032691 A1 | 1/2014 | Barton et al. | |
| 2014/0032759 A1 | 1/2014 | Barton et al. | |
| 2014/0032933 A1 | 1/2014 | Smith et al. | |
| 2014/0041046 A1 | 2/2014 | Vantalon et al. | |
| 2014/0059690 A1 | 2/2014 | Li et al. | |
| 2014/0075493 A1 | 3/2014 | Krishnan et al. | |
| 2014/0081980 A1 | 3/2014 | Aad | |
| 2014/0109178 A1 | 4/2014 | Barton et al. | |
| 2014/0156705 A1 | 6/2014 | Beecham et al. | |
| 2014/0156706 A1 | 6/2014 | Beecham et al. | |
| 2014/0164774 A1 | 6/2014 | Nord et al. | |
| 2014/0181512 A1 | 6/2014 | Spalka et al. | |
| 2014/0230007 A1 | 8/2014 | Roth et al. | |
| 2014/0259117 A1 | 9/2014 | Wachendorf et al. | |
| 2014/0344570 A1 | 11/2014 | Adam et al. | |
| 2014/0344571 A1 | 11/2014 | Adam et al. | |
| 2014/0359793 A1 | 12/2014 | Dobson et al. | |
| 2015/0033039 A1 | 1/2015 | Basmov et al. | |
| 2015/0160879 A1 | 6/2015 | Flynn et al. | |
| 2015/0186657 A1* | 7/2015 | Nakhjiri | H04L 63/06 713/155 |
| 2015/0270956 A1 | 9/2015 | Basmov et al. | |
| 2015/0278531 A1* | 10/2015 | Smith | G06F 21/6218 713/165 |
| 2016/0072796 A1 | 3/2016 | Adam et al. | |
| 2016/0127327 A1 | 5/2016 | Mehta et al. | |
| 2016/0154744 A1 | 6/2016 | Zheng et al. | |
| 2016/0173281 A1 | 6/2016 | White et al. | |
| 2016/0255079 A1 | 9/2016 | Harrison et al. | |
| 2016/0283406 A1 | 9/2016 | Linga et al. | |
| 2017/0004094 A1 | 1/2017 | Basmov et al. | |
| 2017/0005809 A1 | 1/2017 | Adam et al. | |
| 2017/0104768 A1 | 4/2017 | Semenko et al. | |

FOREIGN PATENT DOCUMENTS

| | | |
|---|---|---|
| CN | 102646077 | 8/2012 |
| CN | 103092664 | 5/2013 |
| CN | 103092938 | 5/2013 |
| CN | 103500116 | 1/2014 |
| CN | 103577567 | 2/2014 |
| EP | 2393033 | 12/2011 |
| EP | 2448303 | 5/2012 |
| EP | 2509275 | 10/2012 |
| EP | 2562675 | 2/2013 |
| EP | 2680487 | 1/2014 |
| TW | 200519595 | 6/2005 |
| TW | 200723093 | 6/2007 |
| TW | 201032559 | 9/2010 |
| TW | I540453 | 7/2016 |
| WO | WO-0049488 | 8/2000 |
| WO | WO-2004034184 | 4/2004 |
| WO | WO-2004107646 | 12/2004 |
| WO | WO-2009069043 | 6/2009 |
| WO | WO 2009149019 | 12/2009 |
| WO | WO-2012016091 | 2/2012 |
| WO | WO-2012167392 | 12/2012 |

OTHER PUBLICATIONS

Satyam Sharma, TransCrypt—Design of a Secure and Transparent Encrypting File System, Masters Thesis, Indian Institute of Technology Kanpur (Aug. 2006).*

"Windows Selective Wipe for Device Data Management", Retrieved from <http://technet.microsoft.com/en-us/library/dn486874.aspx>, Nov. 1, 2013, 4 pages.

Li, et al.,' "Scalable and Secure Sharing of Personal Health Records in Cloud Computing Using Attribute-Based Encryption", IEEE Transactions on Parallel and Distributed Systems, vol. 24, Issue 1, Jan. 2013, pp. 131-143.

"Adobe AIR 1.5 Applications with Flex—Storing Encrypted Data", Retrieved From: <http://help.adobe.com/en_US/AIR/1.5/devappsflex/WS5b3ccc516d4fbf351e63e3d118666ade46-7e31.html> May 1, 2015, Oct. 19, 2012, 2 pages.

"Blackberry 10", Retrieved from <http://en.wikipedia.org/wiki/BlackBerry_10#BlackBerry_Balance> on Apr. 2, 2013, Apr. 1, 2013, 8 pages.

"Divide: The Next Generation of Enterprise Mobility", Retrieved at <<http://www.divide.com/download/Divide_Product_Sheet_1116.pdf<< on May 8, 2013, Jan. 20, 2013, 2 pages.

"Exchange ActiveSync", Retrieved from <http://en.wikipedia.org/wiki/Exchange_ActiveSync> on Apr. 1, 2013, Apr. 1, 2013, 5 pages.

"Exchange ActiveSync: Provisioning Protocol", Retrieved from <http://msdn.microsoft.com/en-us/library/dd299443(v=EXCHG.80).aspx> on Apr. 1, 2013, Dec. 3, 2008, 4 Pages.

"Final Office Action", U.S. Appl. No. 13/898,368, dated Apr. 16, 2015, 16 pages.

(56) References Cited

OTHER PUBLICATIONS

"How Can We Ensure Data Security on Mobile Devices??", Retrieved From: <http://enterprise.huawei.com/topic/byod_en/solution_byod_info_3.html> Mar. 6, 2014, Jun. 16, 2013, 4 Pages.
"How Do I Prevent 'Sensitive Data Exposure'?", Retrieved From: <https://www.owasp.org/index.php/Top_10_2013-A6-Sensitive_Data_Exposure> May 12, 2015, Jun. 23, 2013, 2 pages.
"InnoSetup Help", Retrieved From: <http://www.jrsoftware.org/ishelp/index.php?topic=filessection> May 12, 2015, 8 pages.
"International Search Report and Written Opinion", Application No. PCT/US2013/061053, dated Jan. 30, 2014, 10 Pages.
"Mobile Device Management", Retrieved from <http://www.bing.com/search?q=mobile+device+management&src=IE-TopResult&FORM=IE10TR> on Apr. 2, 2013, 2013, 2 pages.
"MobileIron Introduces the First Complete Mobile App Persona for the Enterprise", Retrieved from <http://www.mobileiron.com/en/company/press-room/press-releases/371-mobileiron-introduces-the-first-complete-mobile-app-persona-for-the-enterprise> on Mar. 25, 2013, Nov. 6, 2012, 2 pages.
"Non-Final Office Action", U.S. Appl. No. 13/898,368, dated Dec. 8, 2014, 12 pages.
"OMA Device Management", Retrieved from <http://en.wikipedia.org/wiki/OMA_DM> on Apr. 2, 2013, Mar. 25, 2013, 4 Pages.
"OMA Device Management", Retrieved from <http://msdn.microsoft.com/en-us/library/bb737369.aspx>, Aug. 4, 2010, 4 Pages.
"Securing end-user mobile devices in the enterprise", In Proceedings: Thought Leadership White Paper, IBM Global Technology Services, Apr. 2011, 6 Pages.
"ThoriumCloud Enterprise Container", Retrieved from <http://www.thoriumcloud.com/> on Mar. 25, 2013, 2013, 4 Pages.
"Various Mobile Device Management (MDM) Solutions", Retrieved From: <http://www.bing.com/search?q=mobile+device+management&src=IE-TopResult&FORM=IE10TR> Mar. 5, 2014, 2 Pages.
"What Android Sync'd Data is Encrypted?", Retrieved From: <http://android.stackexchange.com/questions/3129/what-android-syncd-data-is-encrypted>, Nov. 25, 2010, 3 pages.
Becher,"Mobile Security Catching Up? Revealing the Nuts and Bolts of the Security of Mobile Devices", Proceedings of IEEE Symposium on Security and Privacy, May 22, 2011, pp. 96-111.
Bugiel,"Practical and Lightweight Domain Isolation on Android", Proceedings of the 1st ACM Workshop on Security and privacy in Smartphones and Mobile Devices, Oct. 17, 2011, 12 pages.
Gudeth,"Delivering Secure Applications on Commercial Mobile Devices: The Case for Bare Metal Hypervisors", Proceedings of the 1st ACM Workshop on Security and privacy in Smartphones and Mobile Devices, Oct. 17, 2011, pp. 33-38.
Mitchell,"What is a Selective Wipe?", Retrieved from <http://www.landesk.com/blog/what-is-a-selective-wipe/> on Mar. 25, 2013, Apr. 30, 2012, 1 page.
Oberheide,"When Mobile is Harder Than Fixed (and Vice Versa): Demystifying Security Challenges in Mobile Environments", Proceedings of Eleventh International Workshop on Mobile Computing Systems and Applications, Feb. 22, 2010, 6 pages.
Pecherle,"Data Wiping System with Fully Automated, Hidden and Remote Destruction Capabilities", In Journal of WSEAS Transactions on Computers, vol. 9, Issue 9, Available at <http://www.wseas.us/e-library/transactions/computers/2010/88-110.pdf>, Sep. 2010, pp. 939-948.
Pisko,"Trusted Computing in Mobile Platforms—Players, Usage Scenarios, and Interests", Proceedings of Privacy and Security, Sep. 2005, pp. 526-530.
Purdy,"Thumb Drive", Retrieved From: <http://lifehacker.com/5583307/top-10-usb-thumb-drive-tricks-2010-edition> May 12, 2015, Oct. 7, 2010, 6 pages.
Reardon,"Secure Deletion on Log-structured File Systems", In Proceedings: Technical Report, Department of Computer Science, ETH Zurich Available at: <http://arxiv.org/pdf/1106.0917.pdf>, Jun. 5, 2011, 11 pages.

Stehle,"Provisioning, Policies, Remote Wipe, and the Allow/Block/Quarantine list in Exchange ActiveSync", Retrieved from <http://msdn.microsoft.com/en-us/library/exchange/hh509085(v=exchg.140).aspx> on Apr. 1, 2013, 2013, 20 pages.
Stockton,"Divide and your Data: Privacy, Sync, Backup, Restore, Storage and Wipe", Retrieved from <http://support.divide.com/entries/20964987-Divide-and-your-data-privacy-sync-backup-restore-storage-and-wipe> on Mar. 25, 2013, Feb. 8, 2012, 2 pages.
Zeis,"The security of BlackBerry Balance", Retrieved From: <http://crackberry.com/security-blackberry-balance> Mar. 6, 2014, Aug. 2, 2013, 13 pages.
"About EFS (Encrypting File System)", Available at: https://www.elcomsoft.com/help/en/aefsdr/about_efs.html, Oct. 28, 2014, 3 pages.
"Application Encryption—Vormetric Data Security Products", Available at: http://www.vormetric.com/products/vormetric-application-encryption, Jun. 27, 2014, 6 pages.
"Approaches for Encryption of Data at Rest in the Enterprise", In White Papers, 2008, 24 pages.
"BitLocker Drive Encryption in Windows Vista", Microsoft TechNet, retrieved from <http://technet.microsoft.com/en-us/library/cc725719(WS.10).aspx> on Apr. 25, 2011, Aug. 6, 2010, 9 pages.
"CheckVision Enterprise Encryption", Available at: http://assets1.csc.com/banking/downloads/CardsPayments_CheckVisionEnterprise_DS.pdf, Apr. 24, 2013, 2 pages.
"DataStax Enterprise 3.2", Available at: http://docs.datastax.com/en/datastax_enterprise/3.2/datastax_enterprise/sec/secTDE.html—Retrieved on: Jul. 23, 2015, 2 pages.
"Extended European Search Report", EP Application No. 11871440.1, dated Mar. 16, 2015, 5 pages.
"Extended European Search Report", EP Application No. 11871825.3, dated May 11, 2015, 7 pages.
"Final Office Action", U.S. Appl. No. 13/221,629, dated Dec. 23, 2013, 24 pages.
"Foreign Notice of Allowance", CN Application No. 201210314631.1, dated Aug. 20, 2015, 4 pages.
"Foreign Notice of Allowance", CN Application No. 201210314748.X, dated Jul. 3, 2015, 3 pages.
"Foreign Office Action", CN Application No. 201210314631.1, dated Dec. 1, 2014, 14 pages.
"Foreign Office Action", CN Application No. 201210314748.X, dated Mar. 17, 2015, 7 pages.
"Foreign Office Action", CN Application No. 201210314748.X, dated Sep. 23, 2014, 14 Pages.
"International Search Report and Written Opinion", Application No. PCT/US2015/021125, dated Jul. 3, 2015, 9 Pages.
"International Search Report and Written Opinion", Application No. PCT/US2011/055600, dated Jul. 30, 2012, 9 pages.
"International Search Report and Written Opinion", Application No. PCT/US2011/055626, dated Sep. 19, 2012, 9 pages.
"Non-Final Office Action", U.S. Appl. No. 13/221,629, dated May 17, 2013, 27 pages.
"Non-Final Office Action", U.S. Appl. No. 13/221,699, dated Apr. 1, 2013, 16 pages.
"Non-Final Office Action", U.S. Appl. No. 13/898,368, dated Aug. 4, 2015, 17 pages.
"Non-Final Office Action", U.S. Appl. No. 14/221,105, dated Aug. 4, 2015, 25 pages.
"Non-Final Office Action", U.S. Appl. No. 14/506,167, dated Jun. 29, 2015, 16 pages.
"Notice of Allowance", U.S. Appl. No. 13/221,629, dated Jun. 27, 2014, 16 pages.
"Notice of Allowance", U.S. Appl. No. 13/221,699, dated Oct. 30, 2013, 9 pages.
"Oracle Advanced Security", Available at: http://www.oracle.com/technetwork/database/security/ds-advanced-security-tde-psft-129631.pdf, Apr. 16, 2011, 2 pages.
"Search Report", TW Application No. 100136565, dated Aug. 3, 2015, 1 pages.
"Security Solutions and Services", retrieved from <http://www.csc.com/public_sector/offerings/11043/17449-security_solutions_and_services> on Apr. 25, 2011, 2 pages.

(56) References Cited

OTHER PUBLICATIONS

"Transparent Data Encryption (TDE)", Available at: https://msdn.microsoft.com/en-in/library/bb934049.aspx—Retrieved on: Jul. 23, 2015, 11 pages.
"Unlock BitLocker under Windows PC", Retrieved from: <http://windows7migration.info/index.phpoption=com_content&view=article&id=1836:unlock-bitlocker-under-windows-pe&catid=42:4sysops&Itemid=61> Aug. 4, 2011, 5 pages.
Adam,"Enterprise Data Protection: Building Universal Windows Apps That Keep Work and Personal Data Separate and Secure", Available at: https://mix.office.com/watch/fd0jojbqv6qx—Retrieved on: Jul. 23, 2015, 20 pages.
Kalogeropoulos,"Oracle Data Pump Encrypted Dump File Support", In Oracle White Paper, Jul. 2011, 15 pages.
Lane,"Cracking the Confusion: Encryption Layers", Available at: https://securosis.com/blog/cracking-the-confusion-encryption-layers, Feb. 12, 2015, 2 pages.
Lawson,"Meeting Regulatory Compliance Challenges with Data Management Tools Solutions", YL & A, www.ylassoc.com, available at <ftp://public.dhe.ibm.com/software/data/db2imstools/solutions/lawson-reg-compliance.pdf>, Sep. 19, 2006, pp. 1-18.
Li,"Managing Data Retention Policies at Scale", IFIP/IEEE International Symposium on Integrated Network Management 2011, Dublin, Ireland, May 23-27, 2011., available at <http://www.hpl.hp.com/techreports/2010/HPL-2010-203.pdf>, Dec. 21, 2010, 9 pages.
Magnabosco,"Transparent Data Encryption", Available at: https://www.simple-talk.com/sql/database-administration/transparent-data-encryption/, Mar. 16, 2010, 19 pages.
Mont,"A Systemic Approach to Privacy Enforcement and Policy Compliance Checking in Enterprises", Trusted Systems Laboratory, HP Laboratories Bristol, HPL-2006-44, available at <http://www.hpl.hp.com/techreports/2006/HPL-2006-44.pdf>, Mar. 16, 2006, 11 pages.
Toegl,"acTvSM: A Dynamic Virtualization Platform for Enforcement of Application Integrity", Lecture Notes in Computer Science vol. 6802, 2011, Retrieved from <https://online.tugraz.at/tug_online/voe_main2.getvolltext?pCurrPk=60165>, 2011, 20 pages.
Wahl,"Oracle Advanced Security Transparent Data Encryption Best Practices", In Oracle White Paper, Jul. 2012, 29 pages.
"Final Office Action", U.S. Appl. No. 13/898,368, dated Dec. 2, 2015, 19 pages.
"Final Office Action", U.S. Appl. No. 14/221,105, dated Feb. 22, 2016, 35 pages.
"Foreign Office Action", TW Application No. 100136564, dated Oct. 20, 2015, 11 pages.
"International Preliminary Report on Patentability", Application No. PCT/US2013/061053, dated Nov. 24, 2015, 8 pages.
"International Search Report and Written Opinion", Application No. PCT/US2015/058707, dated Jan. 20, 2016, 11 Pages.
"International Search Report and Written Opinion", Application No. PCT/US2015/049981, dated Dec. 3, 2015, 11 pages.
"Non-Final Office Action", U.S. Appl. No. 13/933,928, dated Oct. 21, 2015, 11 pages.
Menezes,"Handbook of Applied Cryptography", CRC Press LLC,, Jan. 1, 1997, pp. 25-27 & 551-553.
"Advisory Action", U.S. Appl. No. 14/506,167, dated Apr. 13, 2016, 3 pages.
"Foreign Notice of Allowance", TW Application No. 100136564, dated Feb. 25, 2016, 4 pages.
"Foreign Notice of Allowance", TW Application No. 100136565, dated Mar. 25, 2016, 4 pages.
"International Search Report and Written Opinion", Application No. PCT/US2015/048750, dated Apr. 11, 2016, 22 pages.
"Non-Final Office Action", U.S. Appl. No. 14/533,921, dated Apr. 19, 2016, 18 pages.
"Notice of Allowance", U.S. Appl. No. 13/933,928, dated Apr. 22, 2016, 8 pages.
"Second Written Opinion", Application No. PCT/US2015/021125, dated Feb. 2, 2016, 6 pages.
Chen,"Hardware-Assisted Application-Level Access Control", ISC '09 Proceedings of the 12th International Conference on Information Security, Sep. 7, 2009, 16 pages.
"Corrected Notice of Allowance", U.S. Appl. No. 14/506,167, dated Sep. 7, 2016, 2 pages.
"Corrected Notice of Allowance", U.S. Appl. No. 14/506,167, dated Sep. 27, 2016, 2 pages.
"Examiner's Answer to Appeal Brief", U.S. Appl. No. 13/898,368, dated Sep. 8, 2016, 7 pages.
"Foreign Office Action", TW Application No. 105101128, dated Aug. 23, 2016, 5 pages.
"International Search Report and Written Opinion", Application No. PCT/US2016/039468, dated Sep. 1, 2016, 10 pages.
"Non-Final Office Action", U.S. Appl. No. 14/788,377, dated Sep. 23, 2016, 14 pages.
"Non-Final Office Action", U.S. Appl. No. 15/266,591, dated Oct. 12, 2016, 10 pages.
"Second Written Opinion", Application No. PCT/US2015/049981, dated Jul. 26, 2016, 5 pages.
"Notice of Allowance", U.S. Appl. No. 14/506,167, dated Jun. 22, 2016, 11 pages.
"Non-Final Office Action", U.S. Appl. No. 14/481,672, dated Jul. 28, 2016, 12 pages.
"Restriction Requirement", U.S. Appl. No. 14/481,672, dated Jun. 28, 2016, 6 pages.
"International Preliminary Report on Patentability", Application No. PCT/US2015/021125, dated May 11, 2016, 7 pages.
"International Preliminary Report on Patentability", Application No. PCT/US2015/049981, dated Oct. 18, 2016, 6 pages.
"International Preliminary Report on Patentability", Application No. PCT/US2015/058707, dated Oct. 27, 2016, 7 pages.
"Second Written Opinion", Application No. PCT/US2015/048750, dated Aug. 8, 2016, 9 pages.
"Batch File Encrypt—Encrypt and decrypt whole files or their parts using symmetric algorithms", Retrieved at: https://web.archive.org/web/20131217055640/http://www.binarymark.com/products/batchfileencrypt/default.aspx—on Dec. 15, 2016, Dec. 17, 2013, 21 pages.
"File locking—Wikipedia", Retrieved at: https://en.wikipedia.org/w/index.php?title=File_locking&oldid=679856482—on Dec. 15, 2016, 5 pages.
"Final Office Action", U.S. Appl. No. 14/481,672, dated Feb. 9, 2017, 16 pages.
"Final Office Action", U.S. Appl. No. 14/506,167, dated Nov. 23, 2015, 19 pages.
"Final Office Action", U.S. Appl. No. 14/533,921, dated Feb. 24, 2017, 15 pages.
"Final Office Action", U.S. Appl. No. 14/788,377, dated May 8, 2017, 20 pages.
"Foreign Notice of Allowance", TW Application No. 110501128, dated Dec. 29, 2016, 4 pages.
"International Preliminary Report on Patentability", Application No. PCT/US2015/048750, dated Dec. 6, 2016, 11 pages.
"International Search Report and Written Opinion", Application No. PCT/US2016/054036, dated Dec. 1, 2016, 12 pages.
"Non-Final Office Action", U.S. Appl. No. 14/221,105, dated Feb. 24, 2017, 42 pages.
"Non-Final Office Action", U.S. Appl. No. 14/879,938, dated Mar. 24, 2017, 16 pages.
"Notice of Allowance", U.S. Appl. No. 15/266,591, dated May 11, 2017, 11 pages.
"Second Written Opinion", Application No. PCT/US2016/039468, dated Dec. 1, 2016, 5 pages.
"Corrected Notice of Allowance", U.S. Appl. No. 15/266,591, dated Jul. 5, 2017, 2 pages.
"Corrected Notice of Allowance", U.S. Appl. No. 15/266,591, dated Jul. 19, 2017, 2 pages.
"Final Office Action", U.S. Appl. No. 14/221,105, dated Aug. 23, 2017, 41 pages.
"Foreign Office Action", CN Application No. 201380076761.9, dated May 31, 2017, 17 pages.
"Notice of Allowance", U.S. Appl. No. 14/481,672, dated Jul. 27, 2017, 7 pages.

(56) References Cited

OTHER PUBLICATIONS

"Second Written Opinion", Application No. PCT/US2016/054036, Aug. 8, 2017, 6 pages.
"Final Office Action", U.S. Appl. No. 14/879,938, dated Sep. 7, 2017, 16 pages.
"International Preliminary Report on Patentability", Application No. PCT/US2016/039468, dated Oct. 9, 2017, 7 pages.
"Notice of Allowance", U.S. Appl. No. 14/533,921, dated Oct. 5, 2017, 9 pages.
"Notice of Allowance", U.S. Appl. No. 14/788,377, dated Sep. 14, 2017, 15 pages.
"PTAB Decision", U.S. Appl. No. 13/898,368, Oct. 18, 2017, 6 pages.

* cited by examiner

SECURE KEY MANAGEMENT FOR ROAMING PROTECTED CONTENT

BACKGROUND

As computing technology has advanced, many different types of computing devices have become commonplace. Users oftentimes have multiple different computing devices, such as a laptop or desktop computer, a tablet device, a smartphone, and so forth. Networked or cloud services can be used to allow users to share data across these multiple devices, giving the users access to their data from any of their multiple devices. However, providing data to such a service can be troublesome for users because it can result in a user's data, which he or she thought would be kept private, being made available to the service provider or other entities (e.g., malicious users that hack into or otherwise compromise the service).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a first computing device content is protected using a data protection public key of a data protection public/private key pair corresponding to an identity of a user of the first computing device. The protected content is copied to cloud storage, and a public key of a public/private key pair of a second computing device is obtained, the first and second computing devices being associated with a same user identity. The data protection private key is encrypted using the public key of the second computing device, and the encrypted data protection private key is provided to the second computing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
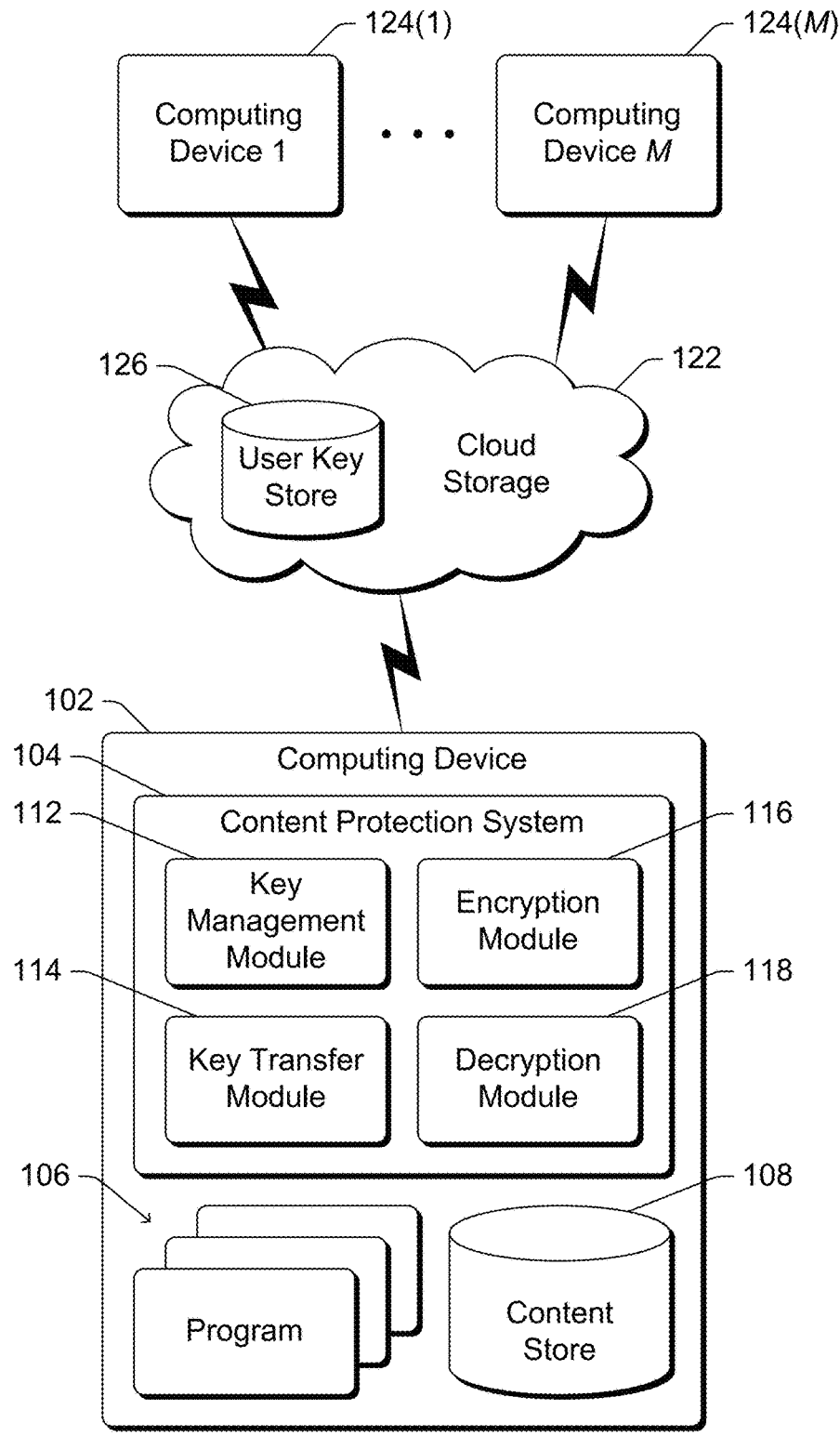
FIG. 1 illustrates an example system implementing the techniques discussed herein in accordance with one or more embodiments.

Secure key management for roaming protected content is discussed herein. A user of a device has a particular identity (e.g., user account) when using the device. Content on the device is encrypted and protected based on a data protection key corresponding to and protected by the particular identity. The content can be encrypted using the data protection key, or the data protection key can be used to encrypt one or more other keys that are used to encrypt the content. The protected content can then be copied to cloud storage, and from the cloud storage the protected content can be transferred to various other ones of the user's devices, also referred to as roaming the content.

The content is encrypted as part of the protection, and the key used to decrypt the content is maintained by the user's device. The cloud storage does not have access to the key used to decrypt the content, and thus does not have access to the plaintext (unencrypted) content.

The key used to decrypt the content can, however, be communicated to other ones of the user's devices. To transfer the key used to decrypt the content to another of the user's devices (a target device), the key used to decrypt the content is protected (e.g., encrypted) with a key of the target device. This protection allows the target device to retrieve the key (e.g., decrypt the key), but prevents other devices from accessing the key. Due to the protection, the protected key can be communicated to the target device via the cloud storage and any communication channels to or from the cloud storage, including an untrusted cloud storage and untrusted communication channels.

The techniques discussed herein advantageously improve the usability and security of computing devices by allowing the user's content to remain protected despite being stored on an untrusted cloud storage or transferred via an untrusted communication channel. The techniques discussed herein further advantageously improve the usability and security of computing devices by allowing the user to access his plaintext content on multiple ones of his devices, while at the same time protecting the plaintext content from being accessed by an untrusted cloud storage, an untrusted communication channel, or other users.

References are made herein to encrypting and decrypting content, which can be performed using symmetric key cryptography or public key cryptography. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Data can be decrypted using the private key, but without the private key it is computationally very difficult to decrypt data that is encrypted using the public key. So, data can be encrypted by any entity with the public key and only decrypted by an entity with the corresponding private key.

In symmetric key cryptography, on the other hand, a shared key (also referred to as a symmetric key) is known by and kept secret by the two entities. Any entity having the shared key is typically able to encrypt data with that shared key, and decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key.

FIG. 1 illustrates an example system 100 implementing the techniques discussed herein in accordance with one or more embodiments. The system 100 includes a computing device 102 that can be a variety of different types of devices. For example, the computing device 102 can be a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, watch), an entertainment device (e.g., an entertainment appliance, a set-top box communicatively coupled to a display device, a game console), a television or other display device, an automotive computer, and so forth. Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The computing device 102 includes a content protection system 104, one or more programs 106, and a content store 108. The programs 106 can include various different applications, parts of an operating system, or other programs that can be run on the computing device 102. The content store 108 is one or more storage devices used to store content by the computing device 102. Content refers to any type of data, instructions, or other information stored by the computing device 102. The content store 108 can be implemented using any of a variety of different types of storage devices, such as solid state devices (e.g., Flash memory), magnetic disks, optical discs, and so forth. Although illustrated as being part of the computing device 102, it should be noted that one or more of the storage devices that make up the content store 108 can be implemented on devices separate from, but communicatively coupled to, the computing device 102 (e.g., external hard drives, removable flash drives).

The content protection system 104 manages protection of content on the computing device 102, including managing the encryption and decryption of content, managing keys used to protect the content, and so forth. The content protection system 104 can be implemented as part of an operating system of the computing device 102, or alternatively as another component or module of the computing device 102 separate from the operating system.

The content protection system 104 includes a key management module 112, a key transfer module 114, an encryption module 116, and a decryption module 118. The key management module 112 generates keys that are used to encrypt and decrypt content, including other keys. The key management module 112 also stores keys on the computing device 102 in a secure manner and controls access to the keys, allowing access to the keys only by those components or modules of the computing device 102 that are permitted to access the keys. These keys include a public/private key pair for the computing device 102. In one or more embodiments, the private key of the computing device 102 is protected in hardware of the computing device 102, such as by wrapping the device private key to a Next Generation Credential, sealing the device private key to a trusted platform module (TPM), sealing the device private key to a smart card, sealing the device private key to a hardware security module (HSM), and so forth.

The key transfer module 114 manages securely transferring keys to and from other computing devices. The key transfer module 114 manages protecting keys for transferring to other computing devices, and retrieving keys from protected keys transferred to the computing device 102. The key transfer module 114 can facilitate encryption of a key to be transferred by providing the key to be transferred to the decryption module 118. The key transfer module 114 can similarly facilitate decryption of a key being transferred to the computing device 102 by providing a key (decrypted by the decryption module 118) to the key management module 112.

The encryption module 116 encrypts content based on one or more keys. This encryption can be performed using any of a variety of different public and/or proprietary encryption techniques or algorithms, and can use symmetric key cryptography or public key cryptography. The decryption module 118 decrypts content based on one or more keys. This decryption can be performed using any of a variety of different public and/or proprietary decryption techniques or algorithms, and can use symmetric key cryptography or public key cryptography.

A user of the computing device 102 also has a particular identity when using the device, such as a user name or user account identifier of the user. This user name or user account identifier is, for example, the name or identifier that the user logs into the computing device 102 with, the name or identifier that the user logs into a service (e.g., of a cloud storage service, also referred to as a cloud service) with, and so forth. The computing device 102 accesses a cloud storage 122, which is a set of components or technologies that allow the short or long term storage of content in one or more locations. The storage of content can be implemented using any of a variety of different storage mechanisms that can be accessed via any of a variety of different data networks (e.g., the Internet, a local area network (LAN), a phone network, an intranet, other public and/or proprietary networks, or combinations thereof) wired connections (e.g., universal serial bus (USB) connections), wireless connections (e.g., wireless USB connections), and so forth. The cloud storage 122 can be a trusted cloud storage that is relied on to keep content secure from other users or devices, or an untrusted cloud storage that is not relied on to keep content secure from other users or devices. The cloud storage 122 is typically one or more storage devices situated remotely from the computing device 102, but can alternatively be other storage devices (e.g., a removable device (e.g., a flash or magnetic drive coupled to the computing device 102 using a wired or wireless connection)).

The cloud storage 122 can be accessed via any of a variety of different communication channels. The communication channel can be a trusted channel or an untrusted channel. A trusted channel refers to a communication channel that is relied on to keep content secure from other users or devices, and an untrusted channel refers to a communication channel that is not relied on to keep content secure from other users or devices.

The cloud storage 122 can optionally be implemented as one of multiple different services (also referred to as cloud services). These cloud services can include, for example, content storage services, content editing services, communication (e.g., email or messaging) services, and so forth. These services can be implemented by one or more of a variety of different types of devices, such as any one or more of those discussed above with reference to computing device 102.

The cloud storage 122 allows content to be shared or roamed among the computing device 102 and other computing devices 124(1), ..., 124(M). Protected content refers to content that has been encrypted, and protected content can be transferred to the cloud storage 122 by one of computing devices 102 or 124, as well as received by others of the computing devices 102 or 124. These computing devices are other computing devices of the user, or other computing devices that the user has logged into. Although the protected content can be transferred to these devices, the protected content cannot be accessed on these devices without the proper keys, as discussed in more detail below. Additionally, it should be noted that the cloud storage 122 need not be trusted by the user of the computing device 102—protected content is stored on the cloud storage 122, and the cloud is not provided with the key to unprotect (decrypt) the content, so the cloud cannot access the plaintext (unencrypted) content.

The cloud storage 122 also maintains a user key store 126, which corresponds to the identity of the user. A user can optionally have different identities at different times (e.g., different times logging into the computing device 102). In one or more embodiments, the identity of the user at any given time is the identity of the user when he or she is logged into the computing device 102 (and/or logged into the cloud storage 122) at that given time. The user key store 126 includes a public key of one or more public/private key pairs, such as a public key of a computing device 102, a public key of one of computing devices 124(1), ..., 124(M), and a data protection public key. These keys are used to protect the content while at the same time allowing the user to access the content from multiple devices as discussed in more detail below.

Figure 2:
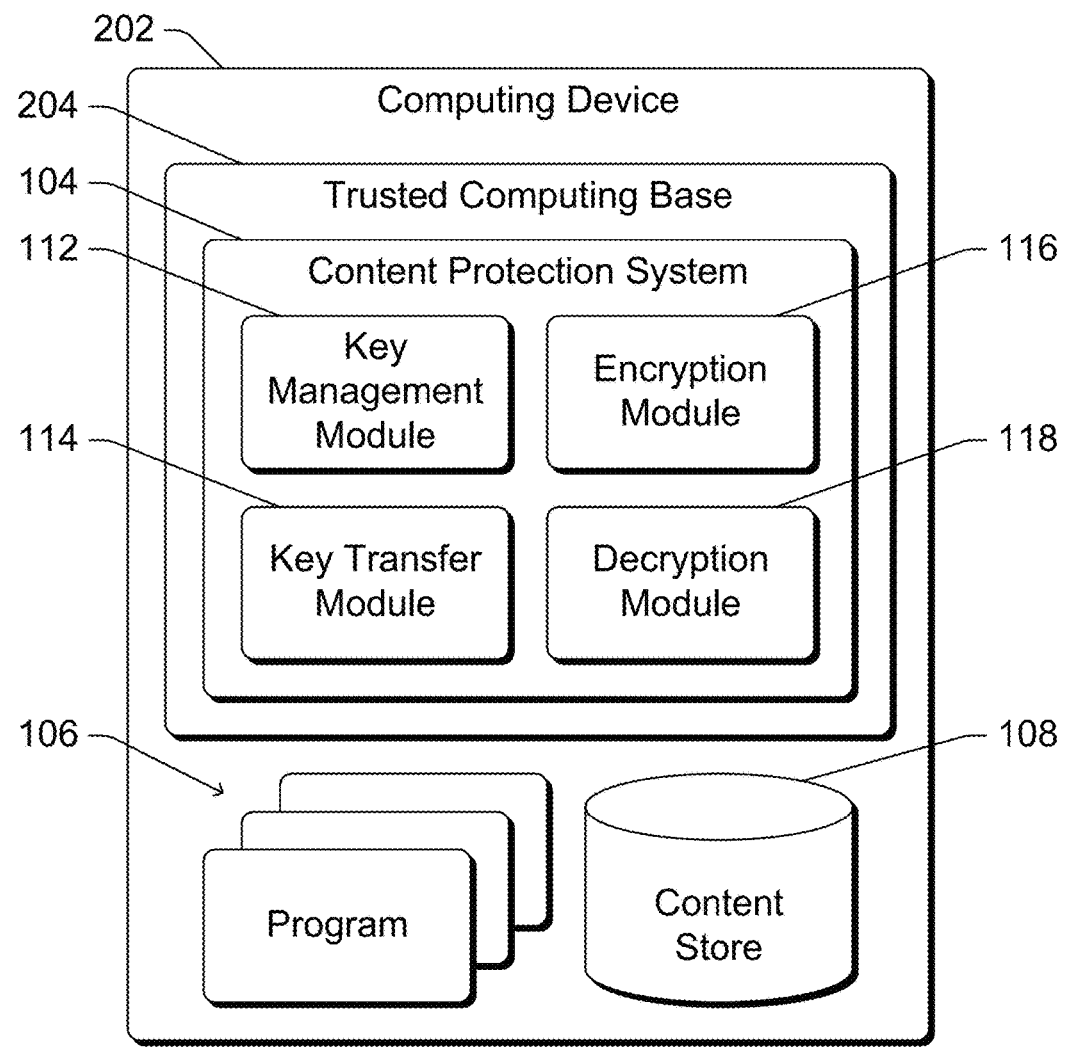
FIG. 2 illustrates another example computing device implementing the techniques discussed herein in accordance with one or more embodiments.

FIG. 2 illustrates another example computing device 202 implementing the techniques discussed herein in accordance with one or more embodiments. The computing device 202 includes a content protection system 104, one or more programs, and a content store 108 analogous to the computing device 102 of FIG. 1. However, the computing device 202 differs from the computing device 102 in that the content protection system 104 is implemented as part of a trusted computing base 204.

The trusted computing base 204 operates as a secure or trusted component of the computing device 202, generating and protecting keys. Components of the trusted computing base 204 can encrypt or decrypt content in response to requests to do so from a program 106 (including requests from the operating system), but the trusted computing base 204 does not reveal the encryption or decryption keys to any other program of module of the computing device 202 that is not included as part of the trusted computing base 204. Thus, if a program 106 were to be malware, or a portion of the operating system of computing device 202 were to be untrusted or compromised by malware, the keys remain protected by the trusted computing base 204 and are not revealed to such a program or operating system. The trusted computing base 204 can, however, transfer keys that have been encrypted to other computing devices, as discussed in more detail below.

Returning to FIG. 1, content on the computing device 102 is protected by the content protection system 104 based on a data protection public/private key pair. The key management module 112 generates the data protection public/private key pair, and keeps the data protection private key secret. The data protection public key is communicated to the cloud storage 122 and stored as part of the user key store 126. The data protection public/private key pair corresponds to or is tied to the identity of the user. If the user has multiple different identities, then multiple different data protection public/private key pairs can be generated (each corresponding to or tied to a different one of the multiple identities), or alternatively a single data protection public/private key pair can be shared across the multiple different identities. At any particular time, the key management module 112 allows the data protection private key corresponding to the user identity at that particular time to be used to protect content, but does not allow data protection private keys corresponding to other user identities to be used to protect content. The data protection private key is thus also referred to as being protected by the particular identity.

The protected content is also stored on the cloud storage 122. This storage of protected content on the cloud storage 122 can be managed by one of the programs 106, such as a content synchronization program. As new content is generated on or otherwise added to the content store 108, the new content is protected by the content protection system 104 and stored on the cloud storage 122 by the content synchronization program. Similarly, as new content is generated on or otherwise added to the content stores of other computing devices 124 (e.g., while the user is logged into such other devices using the same identity) and stored on the cloud storage 122 by the other computing devices 124, the new content is obtained from the cloud storage 122 by the content synchronization program and stored in the content store 108.

The protected content is protected based on the data protection public/private key pair. The content protection system of a computing device 102 or 124 uses the data protection private key to obtain the plaintext content from the protected content. Thus, in order for multiple different ones of the computing devices 102 and 124 to obtain the plaintext content from protected content, the data protection private key is shared among the different computing devices 102 and 124. This sharing is done in a manner that protects the data protection private key, allowing the computing devices 102 and 124 to obtain the data protection private key but preventing other users or devices from obtaining the data protection private key. Thus, the sharing of the data protection private key can be done via unsecure cloud storage and/or unsecure communication channels.

Figure 3:
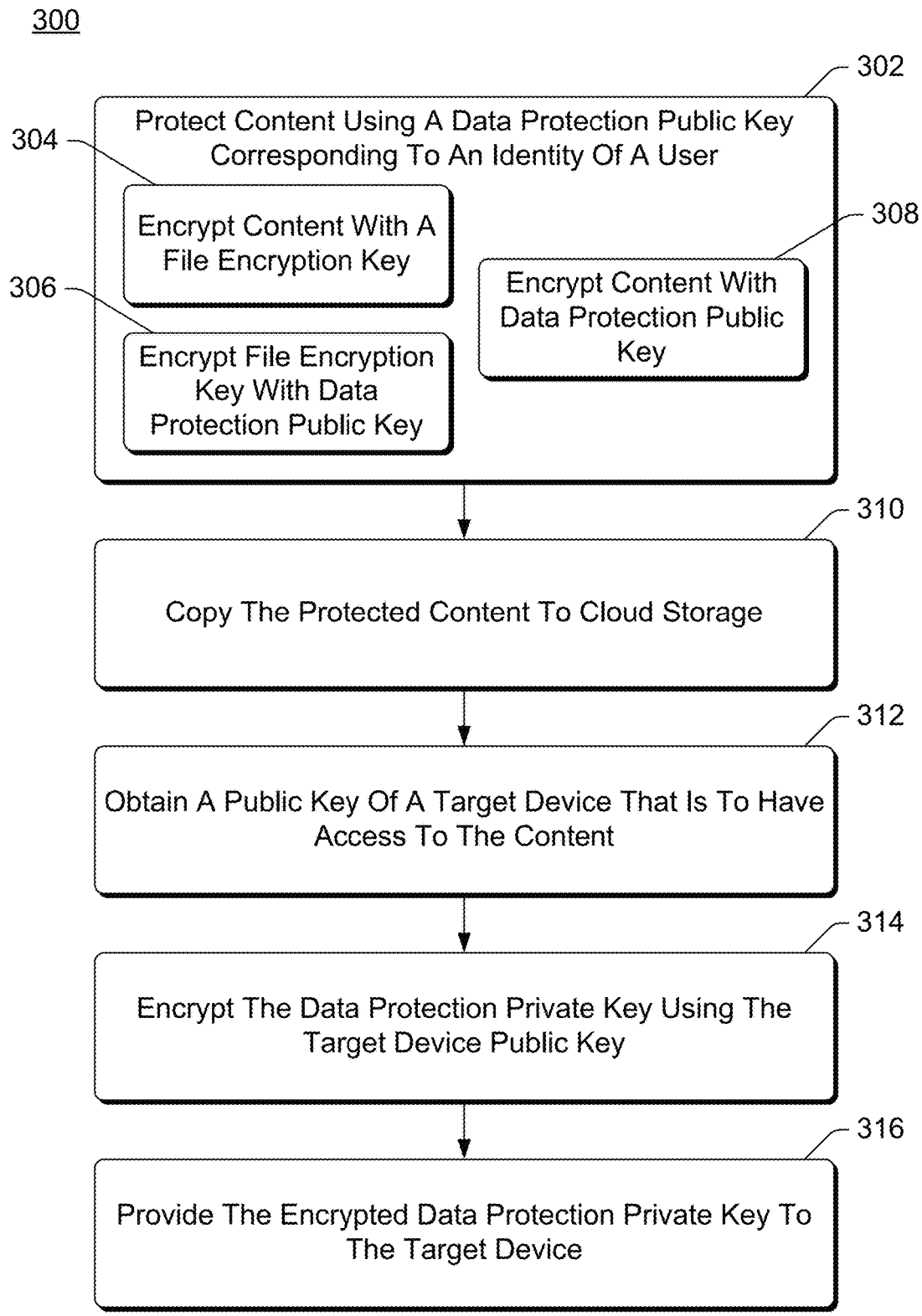
FIG. 3 is a flowchart illustrating an example process for implementing secure key management for roaming protected content in accordance with one or more embodiments.

FIG. 3 is a flowchart illustrating an example process 300 for implementing secure key management for roaming protected content in accordance with one or more embodiments. Process 300 is carried out by a content protection system of a computing device, such as content protection system 104 of FIG. 1 or FIG. 2, and can be implemented in software, firmware, hardware, or combinations thereof. Process 300 is shown as a set of acts and is not limited to the order shown for performing the operations of the various acts. Process 300 is an example process for implementing secure key management for roaming protected content; additional discussions of implementing secure key management for roaming protected content are included herein with reference to different figures.

In process 300, content is protected using a data protection public key corresponding to an identity of the user (act 302). The content can be protected using the data protection public key in various different manners. In one or more embodiments, the content is encrypted using a file encryption key (act 304). The file encryption key is used to encrypt the content by using the file encryption key as the key of an encryption process (e.g., a symmetric encryption process).

The file encryption key is also encrypted with the data protection public key (act 306). The data protection public key is used to encrypt the file encryption key by using the data protection public key as the key of a public key cryptography process. Thus, multiple different keys can be used to protect the content—the file encryption key (e.g., a symmetric key) that is used to encrypt the content, and the data protection public/private key pair of which the data protection public key is used to encrypt the file encryption key.

Alternatively, rather than using a file encryption key, the content is encrypted with the data protection public key (act 308). The data protection public key is used to encrypt the content by using the data protection public key as the key of a public key cryptography process. Thus, the data protection public/private key pair of which the data protection public key is used to encrypt the content can be used to protect the data without any use of a symmetric key.

Regardless of the manner in which the content is protected, the protected content is copied to cloud storage (act 310). Because the content is protected, the cloud storage itself does not have access to the plaintext (unencrypted) content. The protected content is thus stored on the computing device implementing the process 300, and due to copying the protected content to the cloud storage the protected content is stored by the cloud storage and roamed to others of the user's devices.

A public key of a target device that is to have access to the content is obtained (act 312). The public key of the target device can be obtained in a variety of different manners. In one or more embodiments, each computing device that the user logs into has its own public/private key pair. This device public/private key pair is generated by the computing device (e.g., the key management module of the computing device), and the device private key is kept secret by the computing device (e.g., protected in hardware of the computing device as discussed above). However, in one or more embodiments each computing device stores its device public key in the user key store of the cloud (e.g., the user key store 126 of FIG. 1). Thus, each of the computing devices of a user (e.g., those that the user logs into using the same identity) provides its device public key to the cloud, which makes those device public keys available to the other computing devices of the user. Alternatively, a computing device can make its device public key available to the other computing devices of the user in different manners, such as a direct exchange independent of the user key store 126 and/or the cloud (e.g., transferring the device public key to and reading the device public key from a removable flash memory device or phone, transferring the device public key using another wired or wireless communication channel, and so forth).

The data protection private key is encrypted using the target device public key (act 314). By encrypting the data protection private key using the target device public key, the target device is able to retrieve the data protection private key using the target device private key, but other devices (without the target device private key), are not able to retrieve the data protection private key.

The encrypted data protection private key is provided to the target device (act 316). The encrypted data protection private key can be provided to the target device using any of a variety of different mechanisms, such as the cloud storage 122 of FIG. 1, a removable flash memory device or phone, another wired or wireless communication channel, and so forth. It should be noted that, because the data protection private key is encrypted and the target device is the only device with the target device private key, the encrypted data protection private key can be transferred or otherwise communicated to the target device via any of a variety of trusted or untrusted channels.

Once the target device has the encrypted data protection private key, the target device can readily retrieve the data protection private key using the target device private key. The content protection system of the target device keeps the data protection private key secure, and can use the data protection private key to retrieve the plaintext content from the protected content (e.g., by decrypting the file encryption key using the data protection private key and then decrypting the encrypted content using the file encryption key, or by decrypting the encrypted content using the data protection private key).

The target device to which the data protection private key is to be provided can be identified in different manners. In one or more embodiments, the target device communicates a notification to the device implementing process 300 that the target device desires the data protection private key. This notification can be via the cloud storage, or alternatively another communication channel. Alternatively, the target device to which the data protection private key is to be provided can be determined in different manners. For example, the device implementing process 300 (or the user key store 126) can maintain a record of which other devices the data protection policy private key has been provided to, and can automatically store on the cloud storage the data protection private key encrypted using each device public key in the user key store 126 for which the device implementing process 300 has not yet stored an encrypted data protection private key on the cloud storage.

Figure 4:
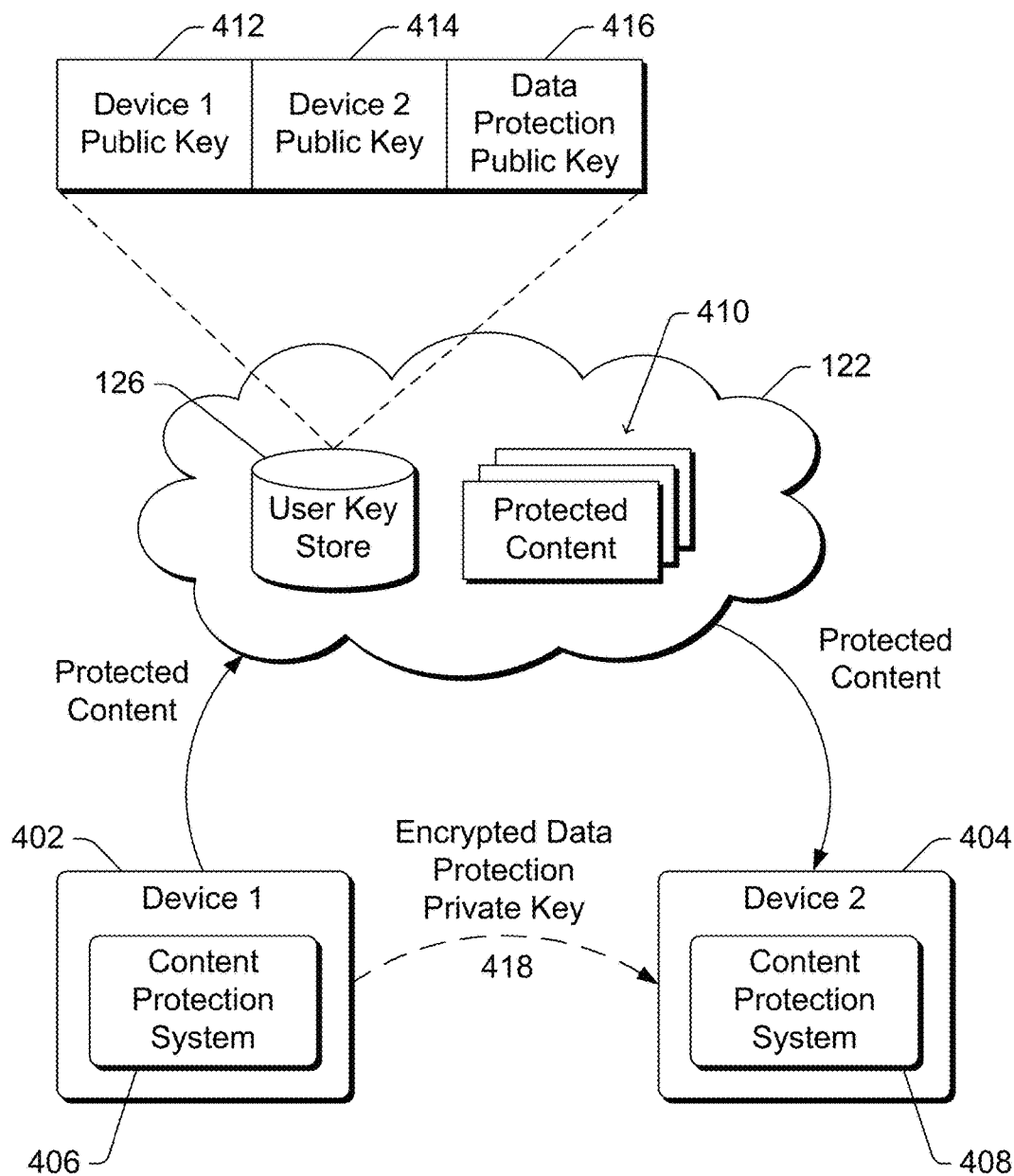
FIG. 4 illustrates an example system in which content is roamed and a data protection private key is shared in accordance with one or more embodiments.

FIG. 4 illustrates an example system 400 in which content is roamed and a data protection private key is shared in accordance with one or more embodiments. A user logs into two different ones of his computing devices 402 and 404 at the same or different times. The user can be, but need not be, logged into both of the computing devices 402 and 404 concurrently in order to roam content and/or share the data protection private key. Each computing device 402 and 404 can be a computing device 102 of FIG. 1 or a computing device 202 of FIG. 2. Each computing device 402 and 404 has a content protection system 406 and 408, respectively, as discussed above. Protected content 410 is provided to the cloud storage 112 by the computing device 402, and copied to the computing device 404 from the cloud storage 112.

The computing device 402 provides a device public key of the computing device 402 to the key store 126, which maintains the key, shown as device 1 public key 412. The computing device 404 provides a device public key of the computing device 404 to the key store 126, which maintains the key, shown as device 2 public key 414. The computing device 402 (or alternatively the computing device 404) also provides the data protection public key to the key store 126, which maintains the key, shown as data protection public key 416. The data protection public key 416 can be used to share data among different devices or different user identities, as discussed in more detail below.

The computing device 402 obtains the device 2 public key 414 from the user key store 126, and encrypts the data protection private key using the device 2 public key 414. The encrypted data protection private key is provided 418 to the computing device 404, allowing the computing device 404 to decrypt the protected content 410.

In one or more embodiments, the data protection public/private key pair is generated by one device, such as the first device that the user logs into using the user identity. The data protection private key is then provided to the other devices of the user as he logs into those other devices using the user identity. Thus, the protected content is protected using the same data protection public/private key pair rather than each device protecting the data using its own data protection public/private key pair.

In one or more embodiments, an additional user verification is performed prior to encrypting and providing the data protection private key to the target device. The computing device from which the data protection private key is being transferred (e.g., the computing device 402 in the example of FIG. 4), also referred to as the source device, prompts the user of the source device to consent to the transfer of the data protection private key. This prompt can be a visual display or other presentation to the user of the source device. This prompt can include a user-generated nonce or other value (e.g., received from the user at the target device and provided to the source device) so that the cloud storage or any other malicious device or component cannot impersonate the target device or user. A user input is received indicating whether the transfer is consented to. The encryption and providing of the data protection private key continues if the transfer is consented to, but does not continue and the data protection private key is not provided to the target device if the transfer is not consented to.

By encrypting and providing the data protection private key to the target device only in response to user consent to transfer the key, additional security protection is advantageously provided against a man-in-the-middle attack. A malicious device or program may attempt a man-in-the-middle attack by pretending to be the target device. The user of both the source device and the target device is typically the user desiring to have the key transferred to the target device, so the user will readily know whether he or she is requesting the transfer. If a prompt to consent to a transfer is provided to the user when he is not having another device of his being set up for data to be roamed to, the user can assume that such a prompt is due to the actions of a malicious device or program, and decline to give consent to the key transfer.

As an added security precaution, an offline verification of the target device can be performed as part of the consent provided by the user. For example, if the data protection private key is to be provided from the device 402 (the source device in this example) to the device 404 (the target device in this example), an identification of the device 404 (e.g., a hash value generated from public key of the device 404) can be displayed or otherwise presented by both the device 402 and the device 404. If the two identifications are the same, then the user can consent to transferring the data protection private key to the device 404. However, if the two identifications are not the same, then consent can be withheld, preventing the data protection private key from being provided to the device 404. If the two identifications are not the same, then the user can assume that a problem has occurred, such as another device or program is posing as the device 404 (e.g., using a man-in-the-middle attack), and so forth.

Thus, the sharing of a data protection private key can be performed in different manners. In one or more embodiments, the sharing is performed from a convenience-based approach. The user can just add a new device to which content is to be roamed (e.g., by logging into the device with his user identity), and a notification is sent to the device 402. The notification can be sent from the cloud (e.g., a notification from the user key store 126 that a new device public key has been added to the user key store 126) or from the new device. In response to the notification, the device 402 cloud provides the encrypted data protection private key to the new device.

Alternatively, the sharing of a data protection private key is performed from a security-based approach. A new device to which content is to be roamed sends a value (e.g., an identifier of the new device or a nonce) to the device 402, which displays or otherwise presents (e.g., plays back audibly) the value at the device 402. User input to the device 402 confirms the value (so that the cloud storage cannot impersonate the user) and that the user agrees to release the data protection private key (encrypted with the public key of the new device) to the new device.

Returning to FIG. 1, the techniques discussed herein allow the encrypted content to be transferred to (roamed to) various other ones of the user's devices. Each of the user's devices can retrieve the plaintext content after obtaining the data protection private key, as discussed above. Furthermore, the techniques discussed herein allow a user to share protected content with other users or other user identities of the same user.

In one or more embodiments, one or more keys of the user key store 126 can be configured to be readable by additional user identities, such as all other user identities, specific user identities (e.g., as specified by the user of the computing device 102), and so forth. These different user identities can be user identities corresponding to different users or the same user. Thus, the data protection public key in the user key store 126 can be made available to other user identities. If a user logged into a computing device 124 desires to communicate content to a user with a particular user identity, the computing device 124 can obtain the data protection public key of the particular user identity from the user key store 126, protect the content using the obtained data protection public key, and store the protected content on the cloud storage. The content can be protected by encrypting the content with the data protection public key of the particular user identity, or by encrypting a file encryption key (that was or is used to encrypt the content) with the data protection public key of the particular user identity. The plaintext content can thus be retrieved from the protected content only by a device with the data protection private key, and the protected content can be communicated to the computing device 102 via the cloud storage 122 or other untrusted cloud storage or communication channel.

As an added security precaution, an offline verification of the data protection public key obtained from the user key store 126 can be performed prior to protecting the content with the obtained data protection public key. For example, if a user A logged into the computing device 124(1) with user identity A desires to share protected content with a user B logged into the computing device 102 with user identity B, the computing device 124(1) obtains the data protection public key of user identity B from the user key store 126. An identification of this obtained data protection public key (e.g., a hash value generated from the obtained data protection public key) can be displayed or otherwise presented to the user A of the computing device 124(1). Furthermore, an identification of the data protection public key (e.g., a hash value generated from the data protection public key) of user identity B can be displayed or otherwise presented to the user B of the computing device 102. These two displayed (or otherwise presented) identifications of the data protection public key can be compared (e.g., by either or both users) to verify the identifications are the same. If the two identifications are the same, then user A (and/or user B) can authorize the computing device 124(1) to proceed with protecting the content with the data protection public key of user identity B. However, if the two identifications are not the same, then user A (and/or user B) can provide an input indicating to the computing device 124(1) to cancel the sharing of the content, and to not protect the content with the data protection public key of user identity B. If the two identifications are not the same, then user A (and/or user B) can assume that a problem has occurred, that another device is posing as the computing device 102 (e.g., using a man-in-the-middle attack), and so forth.

It should be noted that the data protection private key is maintained by the content protection system 104 and is not revealed to the cloud storage 122. There is no centralized key management facility for the various devices where the data protection private key is stored (e.g., no key escrow service or similar service is provided by the cloud storage 122). In one or more embodiments, one or more measures are taken to provide a backup of the data protection private key, allowing seamless recovery of the data protection private key in the event the data protection private key is no longer available from the computing device 102 (e.g., due to the computing device 102 malfunctioning, the computing device 102 being lost or stolen, etc.).

Various different measures can be taken to protect the data protection private key for recovery, such as protecting the data protection private key using biometrics, protecting the data protection private key using a phone, protecting the data protection private key using a secret-question-secret-answer technique, combinations thereof, and so forth. The measures can be taken by the content protection system 104 of FIG. 1 (e.g., the key management module 112).

Protecting the data protection private key using biometrics refers to collecting biometric data regarding the user and deriving a key from the biometric data. The biometric data can take various different forms, such as a fingerprint data, eye scan (e.g., retina scan) data, face scan (e.g., face recognition) data, voice data, and so forth. This biometric data can be converted into a key using any of a variety of public and/or proprietary techniques, such as deriving a key based on the entropy from the biometric data. The key derived from the biometric data is used to encrypt the data protection private key (e.g., using any of a variety of symmetric key cryptography techniques). The encrypted data protection private key can then be stored at a location external to the computing device 102, including the cloud storage 122.

If the data protection private key were to be lost from the computing device 102 (or the computing device 102 were no longer available or usable), the data protection private key can be retrieved by the user. Biometric data is again obtained from the user, and if the biometric data is the same as was used when encrypting the data protection private key, a key derived from the newly obtained biometric data can be used to decrypt the data protection private key.

Protecting the data protection private key using a phone refers to storing the data protection private key on a phone (e.g., a smartphone) of the user's. Although discussed herein as a phone, the data protection private key can alternatively be stored on various other devices that are trusted by the user. The data protection private key can be transferred to the phone in a variety of different manners, including manual entry of the key by the user (e.g., the data protection private key is displayed by the computing device 102, and the user manually enters the key into his or her phone). The data protection private key can alternatively be transferred to the phone in other manners, such as based on automatic identification of a display of the key or a representation of the key by the computing device 102. For example, the data protection private key can be displayed by the computing device 102 and the display captured by a camera of the phone. Optical character recognition can optionally be performed on the captured image to determine the key. By way of another example, a quick response (QR) code that encodes the data protection private key can be displayed by the computing device 102 and captured by a camera of the phone. The data protection private key can alternatively be transferred to the phone in various other wired or wireless manners, such as using a USB connection, a wireless USB connection, infrared communication, NFC (near-field communication), and so forth.

If the data protection private key were to be lost from the computing device 102 (or the computing device 102 were no longer available or usable), the data protection private key can be retrieved from the phone. The key can be provided from the phone to the computing device 102 (or a new computing device) using any of a variety of techniques analogous to those discussed in storing the data protection private key on the phone.

Protecting the data protection private key using a secret-question-secret-answer technique refers to collecting one or more answers to one or more questions. The questions can take various forms, such as questions regarding knowledge of the user's past, questions regarding secret information (e.g., a personal identification number (PIN) or password created by the user), and so forth. The answers are designed to be secret answers that only the user is expected to know. The one or more answers can be converted into a key using any of a variety of public and/or proprietary techniques, such as a one-way hash. The key derived from the one or more answers is used to encrypt the data protection private key (e.g., using any of a variety of symmetric key cryptography techniques). The encrypted data protection private key can then be stored at a location external to the computing device 102, including the cloud storage 122.

If the data protection private key were to be lost from the computing device 102 (or the computing device 102 were no longer available or usable), the data protection private key can be retrieved by the user. The one or more answers are again obtained from the user, and if the one or more answers are the same as the one or more answers used when encrypting the data protection private key, a key derived from the one or more answers can be used to decrypt the data protection private key.

A single one of these different measures (e.g., biometric protection, phone protection, secret-question-secret-answer protection) can be used to protect the data protection private key, or a combination of these different measures can be used to protect the data protection private key. For example, both biometric protection and secret-question-secret-answer protection can be used, so the data protection private key can be retrieved by the user only if biometric data obtained from the user is the same as was used when encrypting the data protection private key, and if one or more answers obtained from the user to one or more questions are the same as the one or more answers used when encrypting the data protection private key.

In the discussions herein, reference is made to a single data protection public/private key pair that is used by all of the computing devices. Alternatively, multiple data protection public/private key pairs can be used, such as a separate data protection public/private key pair for each computing device, multiple data protection public/private key pairs for each of one or more computing devices, and so forth. The data protection private keys for each of these multiple data protection public/private key pairs is provided to the other computing devices using the techniques discussed herein.

It should also be noted that although reference is made to one cloud storage (e.g., cloud storage 122 of FIG. 1), alternatively multiple different cloud storages or cloud services can be used, whether concurrently, sequentially, or even temporarily. For example, different services could be for redundancy of the user key store 126, to have targeted per-service user key stores such as to share securely with more and/or different users, to store the user key store 126 temporarily on a different cloud storage or cloud service for the purpose of sharing with a user on a different cloud storage or cloud service, and so forth.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
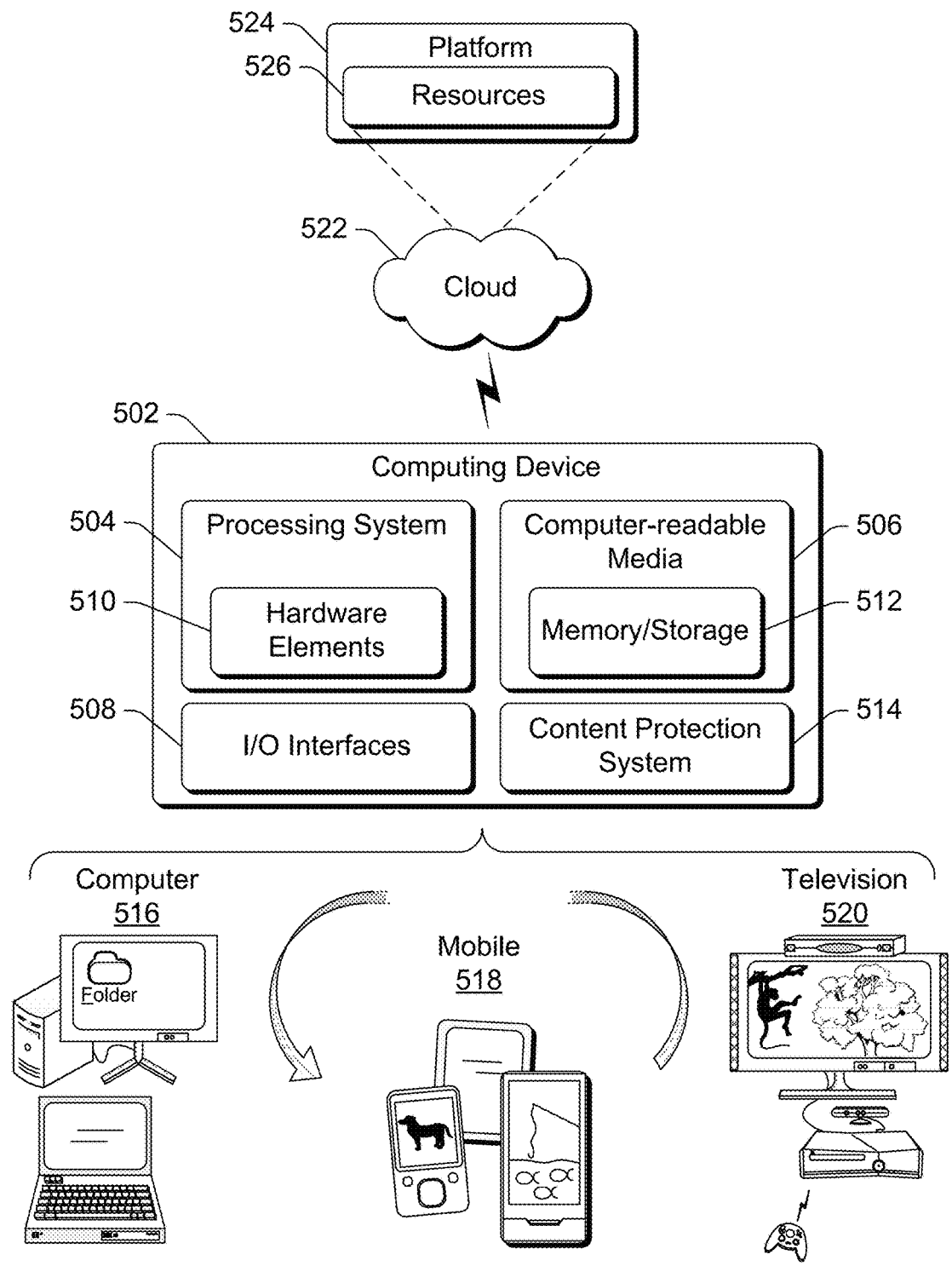
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Computing device 502 also includes a content protection system 514. The content protection system 514 provides various protection of content, including keys, as discussed above. The content protection system 514 can implement, for example, the content protection system 104 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a cloud 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a first computing device comprises: protecting content using a data protection public key of a data protection public/private key pair corresponding to an identity of a user of the first computing device; copying the protected content to cloud storage; obtaining a public key of a public/private key pair of a second computing device, the first and second computing devices being associated with a same user identity; encrypting the data protection private key using the public key of the second computing device; and providing the encrypted data protection private key to the second computing device.

Alternatively or in addition to the above described method, any one or combination of: the providing comprising providing the encrypted data protection private key to the second computing device via a removable drive; the protecting the content comprising encrypting the content with a file encryption key, and encrypting the file encryption key with the data protection public key; the protecting the content comprising encrypting the content with the data protection public key; the providing comprising storing the encrypted data protection private key to the cloud storage; the cloud storage being an untrusted cloud storage that is not relied on to keep the protected content or the encrypted data protection private key secure; receiving additional protected data from the cloud storage, the additional protected data having been protected by a third computing device using the data protection public key, and storing the additional protected data in a content store of the first computing device; displaying a prompt for user consent to transfer the data protection private key to the second computing device, and performing the encrypting and providing only in response to a user input indicating the transfer is consented to; the displaying the prompt for user consent including displaying, at the first computing device, an identification of the second computing device; protecting the data protection private key for recovery, and recovering the data protection private key in response to the data protection private key no longer being available from the first computing device; the protecting further comprising encrypting the data protection private key based on one or both of biometric data of the user and answers from a secret-question-secret-answer technique, and storing the encrypted data protection private key to the cloud storage.

A first computing device comprises an encryption module configured to protect content by encrypting, using a data protection public key of a data protection public/private key pair corresponding to an identity of a user of the first computing device, the content or a file encryption key that is used to encrypt the content; one or more programs configured to copy the protected content to a cloud storage; and a key transfer module configured to: obtain a public key of a public/private key pair of a second computing device, the first and second computing devices being associated with a same user identity on the cloud storage; facilitate the encryption module encrypting the data protection private key using the public key of the second computing device; and provide the encrypted data protection private key to the second computing device.

Alternatively or in addition to the above described computing device, any one or combination of: the cloud storage comprising a cloud service from which the data protection private key is protected; the key transfer module being further configured to display a prompt for user consent to transfer the data protection private key to the second computing device, and facilitate the encryption module encrypting the data protection private key and provide the encrypted data protection private key to the second computing device only in response to a user input indicating the transfer is consented to; the key transfer module being further configured to protect the data protection private key for recovery using biometric data of the user, and subsequently recover the data protection private key, using newly obtained biometric data of the user, in response to the data protection private key no longer being available from the first computing device; display a QR code that encodes the data protection private key for capture by a camera of a phone of the user.

A computer-readable storage medium having stored thereon multiple instructions that, responsive to execution by one or more processors of a computing device, cause the one or more processors to perform operations comprising: protecting content by encrypting a file encryption key using a data protection public key of a data protection public/private key pair corresponding to an identity of a user of the computing device, the content being encrypted using the file encryption key; copying the protected content to a cloud storage; obtaining a public key of a public/private key pair of an additional computing device, the computing device and the additional computing device both accessing the cloud storage for protected content stored to the cloud storage by the other; encrypting the data protection private key using the public key of the additional computing device; and providing the encrypted data protection private key to the additional computing device.

Alternatively or in addition to the above described computer-readable storage medium, any one or combination of: the providing comprising storing the encrypted data protection private key to the cloud storage; the cloud storage being an untrusted cloud storage that is not relied on to keep the protected content or the encrypted data protection private key secure; protecting the data protection private key for recovery, and recovering the data protection private key in response to the data protection private key no longer being available from the computing device.

A first computing device comprises: means for protecting content using a data protection public key of a data protection public/private key pair corresponding to an identity of a user of the first computing device; means for copying the protected content to cloud storage; means for obtaining a public key of a public/private key pair of a second computing device, the first and second computing devices being associated with a same user identity; means for encrypting the data protection private key using the public key of the second computing device; and means for providing the encrypted data protection private key to the second computing device.

Alternatively or in addition to the above described method, any one or combination of: the means for providing comprising means for providing the encrypted data protection private key to the second computing device via a removable drive; the means for protecting the content comprising means for encrypting the content with a file encryption key, and means for encrypting the file encryption key with the data protection public key; the means for protecting the content comprising means for encrypting the content with the data protection public key; the means for providing comprising means for storing the encrypted data protection private key to the cloud storage; the cloud storage being an untrusted cloud storage that is not relied on to keep the protected content or the encrypted data protection private key secure; means for receiving additional protected data from the cloud storage, the additional protected data having been protected by a third computing device using the data protection public key, and means for storing the additional protected data in a content store of the first computing device; means for displaying a prompt for user consent to transfer the data protection private key to the second computing device, and means for performing the encrypting and providing only in response to a user input indicating the transfer is consented to; the means for displaying the prompt for user consent including means for displaying, at the first computing device, an identification of the second computing device; means for protecting the data protection private key for recovery, and means for recovering the data protection private key in response to the data protection private key no longer being available from the first computing device; the means for protecting further comprising means for encrypting the data protection private key based on one or both of biometric data of the user and answers from a secret-question-secret-answer technique, and means for storing the encrypted data protection private key to the cloud storage.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a first computing device, the method comprising:
    protecting, by the first computing device, content using a data protection public key of a first data protection public/private key pair corresponding to an identity of a user of the first computing device;
    copying, by the first computing device, the protected content to cloud storage;
    obtaining, by the first computing device, a public key of a second public/private key pair of a second computing device from a key store in the cloud storage, the first and second computing devices being separate computing devices, the first and second computing devices and the key store being associated with a same user identity, the key store configured to store device public keys corresponding to multiple devices associated with the same user identity, the key store further configured to make the device public keys of the respective multiple devices available to other devices of the multiple devices associated with the same user identity by the other devices accessing the key store in the cloud storage;
    encrypting, by the first computing device, the data protection private key using the public key of the second computing device; and
    providing, by the first computing device, the encrypted data protection private key to the second computing device.

2. The method as recited in claim 1, the providing comprising providing the encrypted data protection private key to the second computing device via a removable drive.

3. The method as recited in claim 1, the protecting the content comprising:
    encrypting the content with a file encryption key; and
    encrypting the file encryption key with the data protection public key.

4. The method as recited in claim 1, the protecting the content comprising encrypting the content with the data protection public key.

5. The method as recited in claim 1, the providing comprising storing the encrypted data protection private key to the cloud storage.

6. The method as recited in claim 1, the cloud storage being an untrusted cloud storage that is not relied on to keep the protected content or the encrypted data protection private key secure.

7. The method as recited in claim 1, further comprising:
    receiving additional protected data from the cloud storage, the additional protected data having been protected by a third computing device using the data protection public key; and
    storing the additional protected data in a content store of the first computing device.

8. The method as recited in claim 1, further comprising:
    displaying a prompt for user consent to transfer the data protection private key to the second computing device; and
    performing the encrypting and providing only in response to a user input indicating the transfer is consented to.

9. The method as recited in claim 8, the displaying the prompt for user consent including displaying, at the first computing device, an identification of the second computing device.

10. The method as recited in claim 1, further comprising:
    protecting the data protection private key for recovery; and
    recovering the data protection private key in response to the data protection private key no longer being available from the first computing device.

11. The method as recited in claim 10, the protecting the data protection private key for recovery further comprising:
    encrypting the data protection private key based on one or both of biometric data of the user and answers from a secret-question-secret-answer technique; and
    storing the encrypted data protection private key to the cloud storage.

12. A first client computing device comprising:
    a processing system and memory configured to implement an algorithm of the first client computing device to protect content by encrypting, using a data protection public key of a first data protection public/private key pair corresponding to an identity of a user of the first client computing device, the content or a file encryption key that is used to encrypt the content;
    one or more programs configured to copy, by the first client computing device, the protected content to a cloud storage; and
    the processing system and memory further configured to:
        obtain, by the first client computing device, a public key of a second public/private key pair of a second client computing device from a key store in the cloud storage, the first and second client computing devices being separate computing devices, the first and second client computing devices and the key store being associated with a same user identity on the cloud storage, the key store configured to store device public keys corresponding to multiple devices associated with the same user identity, the key store further configured to make the device public keys of the respective multiple devices available to other devices of the multiple devices associated with the same user identity;
        facilitate, by the first client computing device, the algorithm encrypting the data protection private key by the first client computing device using the public key of the second client computing device; and provide, by the first client computing device, the encrypted data protection private key to the second client computing device via the cloud storage, the encrypted data protection private key configured to be decrypted using the private key of the second public/private key pair of the second client computing device, and, once decrypted, facilitate decryption of the content or the file encryption key used to encrypt the content by the second computing device.

13. The first client computing device as recited in claim 12, the cloud storage comprising a cloud service from which the data protection private key is protected.

14. The first client computing device as recited in claim 12, the processing system and memory being further configured to:
   display a prompt for user consent to transfer the data protection private key to the second client computing device; and
   facilitate the algorithm encrypting the data protection private key and provide the encrypted data protection private key to the second client computing device only in response to a user input indicating the transfer is consented to.

15. The first client computing device as recited in claim 12, the processing system and memory being further configured to:
   protect the data protection private key for recovery using biometric data of the user; and
   subsequently recover the data protection private key, using newly obtained biometric data of the user, in response to the data protection private key no longer being available from the first client computing device.

16. The first client computing device as recited in claim 12, being further configured to display a QR code that encodes the data protection private key for capture by a camera of a phone of the user.

17. A computer-readable storage medium having stored thereon multiple instructions that, responsive to execution by one or more processors of a client computing device, cause the one or more processors to perform operations comprising:
   protecting, by the client computing device, content by encrypting a file encryption key using a data protection public key of a first data protection public/private key pair corresponding to an identity of a user of the client computing device, the content being encrypted using the file encryption key;
   copying, by the client computing device, the protected content to a cloud storage;
   obtaining, by the client computing device, a public key of a second public/private key pair of a separate, additional client computing device from a key store in the cloud storage, the client computing device and the additional client computing device both accessing the cloud storage for protected content stored to the cloud storage by the other, the cloud storage comprising a key store that is accessible by the client computing device and the additional client computing device, the key store configured to store device public keys corresponding to multiple devices, and make the device public keys of the respective multiple devices available to other devices of the multiple devices by the other devices accessing the key store in the cloud storage;
   encrypting, by the client computing device, the data protection private key by the client computing device using the public key of the additional client computing device; and
   providing, by the client computing device, the encrypted data protection private key to the additional client computing device, the encrypted data protection private key configured to be decrypted using the private key of the second public/private key pair of the second client computing device, and, once decrypted, facilitate decryption of the file encryption key used to encrypt the content by the second computing device.

18. The computer-readable storage medium as recited in claim 17, the providing comprising storing the encrypted data protection private key to the cloud storage.

19. The computer-readable storage medium as recited in claim 17, the cloud storage being an untrusted cloud storage that is not relied on to keep the protected content or the encrypted data protection private key secure.

20. The computer-readable storage medium as recited in claim 17, further comprising:
   protecting the data protection private key for recovery; and
   recovering the data protection private key in response to the data protection private key no longer being available from the client computing device.

* * * * *